US008483505B2

(12) United States Patent
Ilbery

(10) Patent No.: US 8,483,505 B2
(45) Date of Patent: Jul. 9, 2013

(54) RENDERING PIECE-WISE SMOOTH IMAGE FROM COLOUR VALUES ALONG PATHS

(75) Inventor: Peter William Mitchell Ilbery, Dundas (AU)

(73) Assignee: Canon Kabushiki Kaisha, Tokyo (JP)

(*) Notice: Subject to any disclaimer, the term of this patent is extended or adjusted under 35 U.S.C. 154(b) by 134 days.

(21) Appl. No.: 12/968,762

(22) Filed: Dec. 15, 2010

(65) Prior Publication Data

US 2011/0142364 A1 Jun. 16, 2011

(30) Foreign Application Priority Data

Dec. 16, 2009 (AU) ................................ 2009250986

(51) Int. Cl.
*G06K 9/40* (2006.01)
(52) U.S. Cl.
USPC ........... 382/269; 382/162; 382/232; 345/611; 345/616
(58) Field of Classification Search
USPC .................. 382/269, 162, 232; 345/611, 616
See application file for complete search history.

(56) References Cited

U.S. PATENT DOCUMENTS

| 4,674,058 | A * | 6/1987 | Lindbloom et al. ........... 345/441 |
| 7,038,697 | B2 | 5/2006 | Gangnet et al. |
| 7,251,366 | B1 * | 7/2007 | Silver et al. .................... 382/209 |
| 7,427,994 | B2 | 9/2008 | Gangnet et al. |
| 8,000,539 | B2 * | 8/2011 | Guleryuz et al. ............. 382/232 |
| 8,218,895 | B1 * | 7/2012 | Gleicher et al. ............. 382/275 |
| 2004/0164992 | A1 | 8/2004 | Gangnet et al. |
| 2005/0131973 | A1 * | 6/2005 | Chambers et al. ............ 708/204 |
| 2005/0237341 | A1 | 10/2005 | Gangnet et al. |
| 2007/0133862 | A1 * | 6/2007 | Gold et al. .................... 382/149 |
| 2007/0160303 | A1 | 7/2007 | Guleryuz et al. |
| 2008/0101714 | A1 * | 5/2008 | Ono .............................. 382/260 |
| 2008/0212873 | A1 * | 9/2008 | Allen ............................ 382/162 |
| 2010/0183240 | A1 * | 7/2010 | Hiraga et al. ................. 382/264 |

OTHER PUBLICATIONS

V. Caselles, F. Catte, T. Coll, et al., "A Geometric Model for Active Contours in Image Processing," Numerische Mathematik, 66(1): Oct. 1-31, 1993.*
Norimasa Yoshida and Takafumi Saito, Interactive Aesthetic Curve Segments, The Visual Computer (Pacific Graphics), vol. 22, No. 9-11, pp. 896-905, 2006.*

(Continued)

*Primary Examiner* — Stephen R Koziol
*Assistant Examiner* — Shaghayegh Azima
(74) *Attorney, Agent, or Firm* — Fitzpatrick, Cella, Harper & Scinto

(57) ABSTRACT

Methods, apparatuses, and computer program products for rendering a piece-wise smooth image are disclosed. The image is specified by image values along opposite sides of paths. The paths are converted to chains of straight line segments, and image values are set for each side of each segment. Coefficients are determined for each line segment. A first coefficient for each segment is based on a difference between specified image values on opposite sides of the segment. A second coefficient for each segment is obtained using an average of image values on opposite sides of the segment and a system of linear equations. Each image value is calculated as the addition of a sum over all segments of the product of first coefficient for a segment with a dipole field value for the segment and a sum over all segments of the product of second coefficient for a segment with a logarithmic field value for the segment.

21 Claims, 9 Drawing Sheets

OTHER PUBLICATIONS

Kenjiro T. Miura, "A general equation of aesthetic curves and its self-affinity" Department of Mechanical Engineering, Shizuoka University. 3-5-1 Johoku.*

Ilbery, P.; Taubman, D.; Bradley, A.; , "Mixed content image compression by gradient field integration," Image Processing, 2008. ICIP 2008. 15th IEEE International Conference on , vol., no., pp. 1053-1056, Oct. 12-15, 2008.*

Orzan et al., "A Vector Representation for Smooth-Shaded Images"; An ACM Transactions on Graphics (Proceedings of SIGGRAPH 2008), SIGGRAPH: 2008.

* cited by examiner

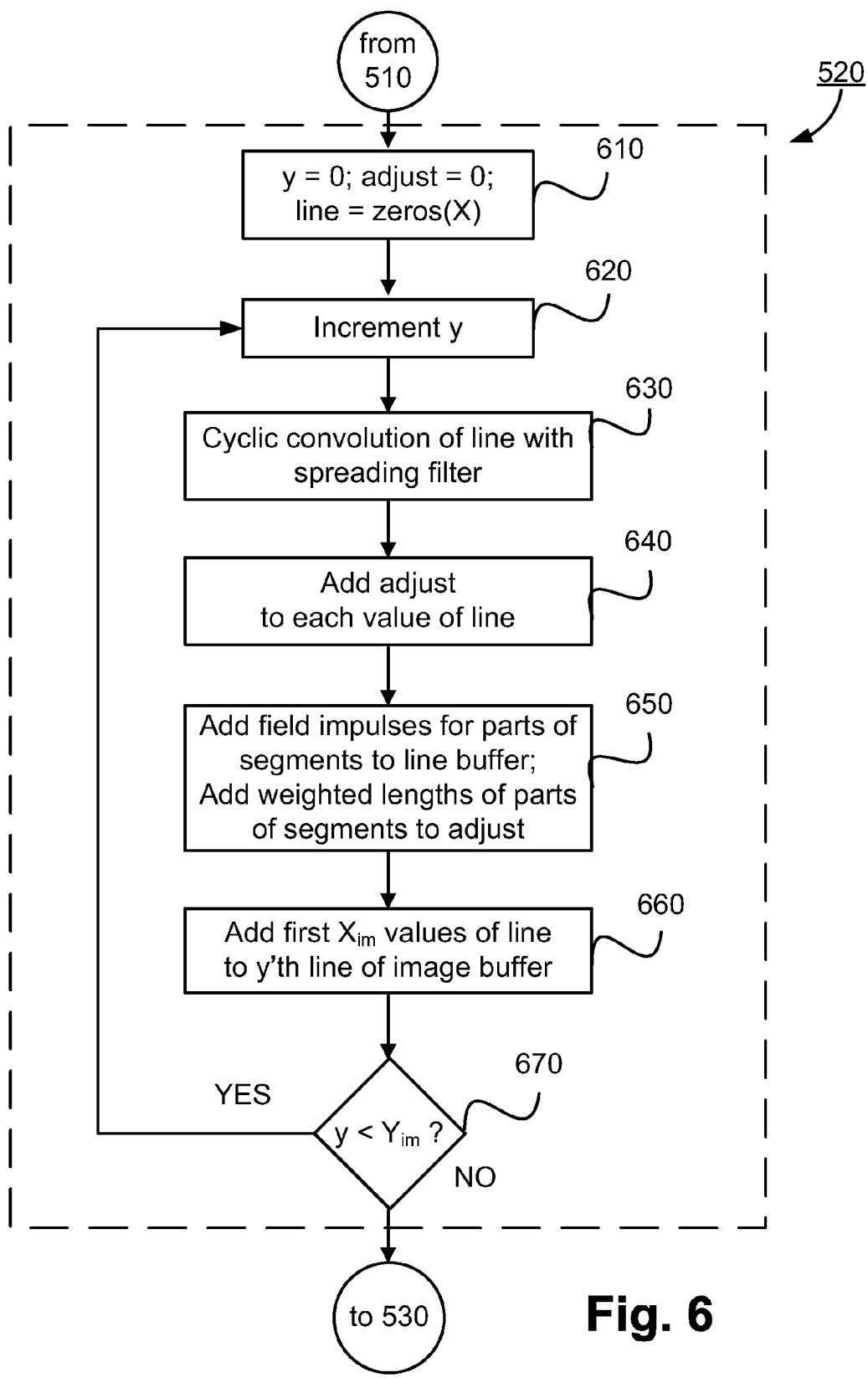

RENDERING PIECE-WISE SMOOTH IMAGE FROM COLOUR VALUES ALONG PATHS

REFERENCE TO RELATED PATENT APPLICATION

This application claims the benefit under 35 U.S.C. §119 of the filing date of Australian Patent Application No. 2009250986, filed 16 Dec. 2009 in the name of Canon Kabushiki Kaisha, hereby incorporated by reference in its entirety as if fully set forth herein.

TECHNICAL FIELD

The current invention relates generally to computer graphics and in particular to rendering an image with smoothly changing colour values between line paths.

BACKGROUND

In computer graphics, smooth colour variation in images is often specified by use of linear or radial colour gradients, which are also known as linear blends and radial blends. More complex colour variation in graphics images is sometimes specified using a gradient mesh, where colours are specified at vertices of the mesh.

Specifying complex and smooth colour variation in graphic images has recently been proposed by firstly specifying colour values along paths (i.e. lines) and secondly determining colour values at positions between paths as a spatial averaging of colour values along nearby paths. In one approach to spatial averaging, colour values between paths are obtained by solving Laplace's equation using finite differences, successive over-relation and/or multigrid, with boundary constraints provided by the colour values along the paths. This approach gives pleasing smooth colour variation.

In recent extensions to this approach, colours are specified immediately to either side of paths, thereby introducing a sharp change in colour, or edge, along the path. Specifying colour variation using paths has the advantage that doing so builds on the natural tendency for artists to draw line-art and for observers to recognise image features from edges. Specifying colour variations using paths is a more compact representation of complex colour variation and more easily editable by graphic artists than the gradient mesh representation.

In computer graphics applications, to render visually appealing images with interactive response times on inexpensive systems, it is important to implement solutions to Laplace's equation with sufficient accuracy while providing fast operation using typical computing resources.

Multigrid provides a popular method of solving Laplace's equation. However, multigrid is a multi-scale and iterative calculation method, which requires repeated access to intermediate, transient image values for a range of image scales. When images are large, this method requires repeated access across a large memory space. Generally, for fast implementation using typical computer processors, non-iterative algorithms with predominantly localised memory access are preferred. Also, using multigrid to solve Laplace's equation is essentially an "all or nothing" method, which requires image values to be computed for the entire image. However, in some applications, only parts of an image are required to be rendered at a time.

Solving Laplace's equation using Multigrid involves setting constraints at grid points, then deriving values at other grid points. When colour values are specified along paths, constraint values at grid points near paths can only be estimated; that is, there is an initial inaccuracy in the constraint rasterisation which is then propagated to derived values. There is a requirement to render videos consisting of successive images specified by colour values along either side of paths, where the path geometry changes from frame to frame. When Multigrid, or other methods of solving Laplace's equation which perform an initial constraint rasterisation, are used to render such videos, the inaccuracies in the constraint rasterisation tend to cause flickering artefacts.

SUMMARY

In accordance with an aspect of the invention, there is provided a computer-implemented method of rendering a piece-wise smooth image, the image specified by image values along opposite sides of paths. The method comprises: converting the paths to chains of straight line segments and setting image values for each side of each line segment; determining first and second coefficients for each line segment, the first coefficient for each line segment being based on a difference between the specified image values on opposite sides of the segment, the second coefficient for each line segment being based on an average of the image values on opposite sides of the segment; and calculating each image value using the addition of a sum over all line segments of the product of the first coefficient for a segment with a dipole field value for the segment and a sum over all line segments of the product of the second coefficient for a segment with a logarithmic field value for the segment.

Either or both dipole potential field function and logarithmic potential field function may be periodic. Either or both the periodic dipole and logarithmic potential field functions may be used in the calculating step to calculate image values in a line-by-line process using cyclic convolution of periodic image data sequences. Either or both of the sums over all line segments may be calculated as a sum of values calculated in a forward direction line-by-line pass through the image and values calculated in a reverse direction line-by-line pass through the image. Each line of the sums of values calculated in a line-by line pass through the image may be calculated using the sum of values of a previous line convolved with a filter, and the sum of line segment field function values, for portions of the line segments intersecting the region preceding the current line and not yet included in a sum of line segment field function values for the pass, multiplied by a coefficient for the line segment.

The method may further comprise the step of outputting the image using the calculated image values using a printer or graphical display device.

The image may be an entire image or a portion of a larger image.

Each image value f(x, y) may be calculated using the following equation:

$$f(x, y) = \sum_i \alpha_i D_i(x, y) + \sum_i \beta_i L_i(x, y)$$

where $D_i(x, y)$ is the value, at a field point (x, y), of the integral of unweighted dipole fields centered at points along the i'th straight line segment and oriented normal to the straight line segment to be positive on the left hand side, and $L_i(x, y)$ is the value, at a field point (x, y), of the integral of unweighted logarithmic fields centered at points along the i'th straight line segment. Further, the determining step may comprise calculating the second coefficients by solving a system of linear equations as follows:

$$\sum_j \beta_j L_j(x_i, y_i) = \frac{{}_i c_L + {}_i c_R}{2} - \sum_j \alpha_j D_j(x_i, y_i)$$

where $\alpha_j$ is the first coefficient for the j'th straight line segment, $\beta_j$ is the second coefficient for the j'th straight line segment, ${}_i c_L$ is a representative value for the image values along the left of the i'th straight line segment and ${}_i c_R$ is a representative value for the image values along the right of the i'th straight line segment.

Each image value f(x, y) may also be calculated using the following equation:

$$f(x, y) = \sum_i \alpha_i D_i(x, y) + \sum_i \beta_i L_i(x, y) + c$$

where $D_i$ (x, y) is the value, at a field point (x, y), of the integral of unweighted dipole fields centered at points along the i'th straight line segment and oriented normal to the straight line segment to be positive on the left hand side, and $L_i$ (x, y) is the value, at a field point (x, y), of the integral of unweighted logarithmic fields centered at points along the i'th straight line segment, and 'c' is a constant value. Further, the determining step may comprise calculating the constant value 'c' and the second coefficients by solving a system of linear equations as follows:

$$\sum_i \beta_i L_i(x_i, y_i) = 0$$

$$\sum_j \beta_j L_j(x_i, y_i) = \frac{{}_i c_L + {}_i c_R}{2} - \sum_j \alpha_j D_j(x_i, y_i)$$

where $\alpha_j$ is the first coefficient for the j'th straight line segment, $\beta_j$ is the second coefficient for the j'th straight line segment, ${}_i c_L$ is a representative value for the image values along the left of the i'th straight line segment and ${}_i c_R$ is a representative value for the image values along the right of the i'th straight line segment.

In accordance with another aspect of the invention, there is provided an apparatus for rendering a piece-wise smooth image, the image specified by image values along opposite sides of path. The apparatus comprises: a memory for storing data and a computer program; and a processor unit coupled to the memory for executing a computer program, the memory and the processor configured to render the piece-wise smooth image. The computer program comprises: a computer program code module for converting the paths to chains of straight line segments and setting image values for each side of each line segment; a computer program code module for determining first and second coefficients for each line segment, the first coefficient for each line segment being based on a difference between the specified image values on opposite sides of the segment, the second coefficient for each line segment being based on an average of the image values on opposite sides of the segment; and a computer program code module for calculating each image value as the addition of a sum over all line segments of the product of the first coefficient for a segment with a dipole field value for the segment and a sum over all line segments of the product of the second coefficient for a segment with a logarithmic field value for the segment.

Either or both dipole potential field function and logarithmic potential field function may be periodic. Either or both the periodic dipole and logarithmic potential field functions may be used in the computer program code module to calculate image values in a line-by-line process using cyclic convolution of periodic image data sequences. Either or both of the sums over all line segments may be calculated as a sum of values calculated in a forward direction line-by-line pass through the image and values calculated in a reverse direction line-by-line pass through the image. Each line of the sums of values calculated in a line-by line pass through the image may be calculated as the sum of values of a previous line convolved with a filter, and the sum of line segment field function values, for portions of the line segments intersecting the region preceding the current line and not yet included in a sum of line segment field function values for the pass, multiplied by a coefficient for the line segment.

In accordance with yet another aspect of the invention, there is provided a computer readable storage medium having recorded therein a computer program for rendering a piece-wise smooth image. The computer program comprises: a computer program code module for converting the paths to chains of straight line segments and setting image values for each side of each line segment; a computer program code module for determining first and second coefficients for each line segment, the first coefficient for each line segment being based on a difference between the specified image values on opposite sides of the segment, the second coefficient for each line segment being based on an average of the image values on opposite sides of the segment; and a computer program code module for calculating each image value using the addition of a sum over all line segments of the product of the first coefficient for a segment with a dipole field value for the segment and a sum over all line segments of the product of the second coefficient for a segment with a logarithmic field value for the segment.

Either or both dipole potential field function and logarithmic potential field function may be periodic. Either or both the periodic dipole and logarithmic potential field functions may be used in the computer program code module to calculate image values in a line-by-line process using cyclic convolution of periodic image data sequences. Either or both of the sums over all line segments may be calculated as a sum of values calculated in a forward direction line-by-line pass through the image and values calculated in a reverse direction line-by-line pass through the image. Each line of the sums of values calculated in a line-by line pass through the image may be calculated using the sum of values of a previous line convolved with a filter, and the sum of line segment field function values, for portions of the line segments intersecting the region preceding the current line and not yet included in a sum of line segment field function values for the pass, multiplied by a coefficient for the line segment.

BRIEF DESCRIPTION OF THE DRAWINGS

Embodiments of the invention are described hereinafter with reference to the following drawings, in which:

FIG. 6 is also a schematic flow diagram illustrating the line-by-line calculation of image values of the second embodiment;

DETAILED DESCRIPTION

Figure 1:
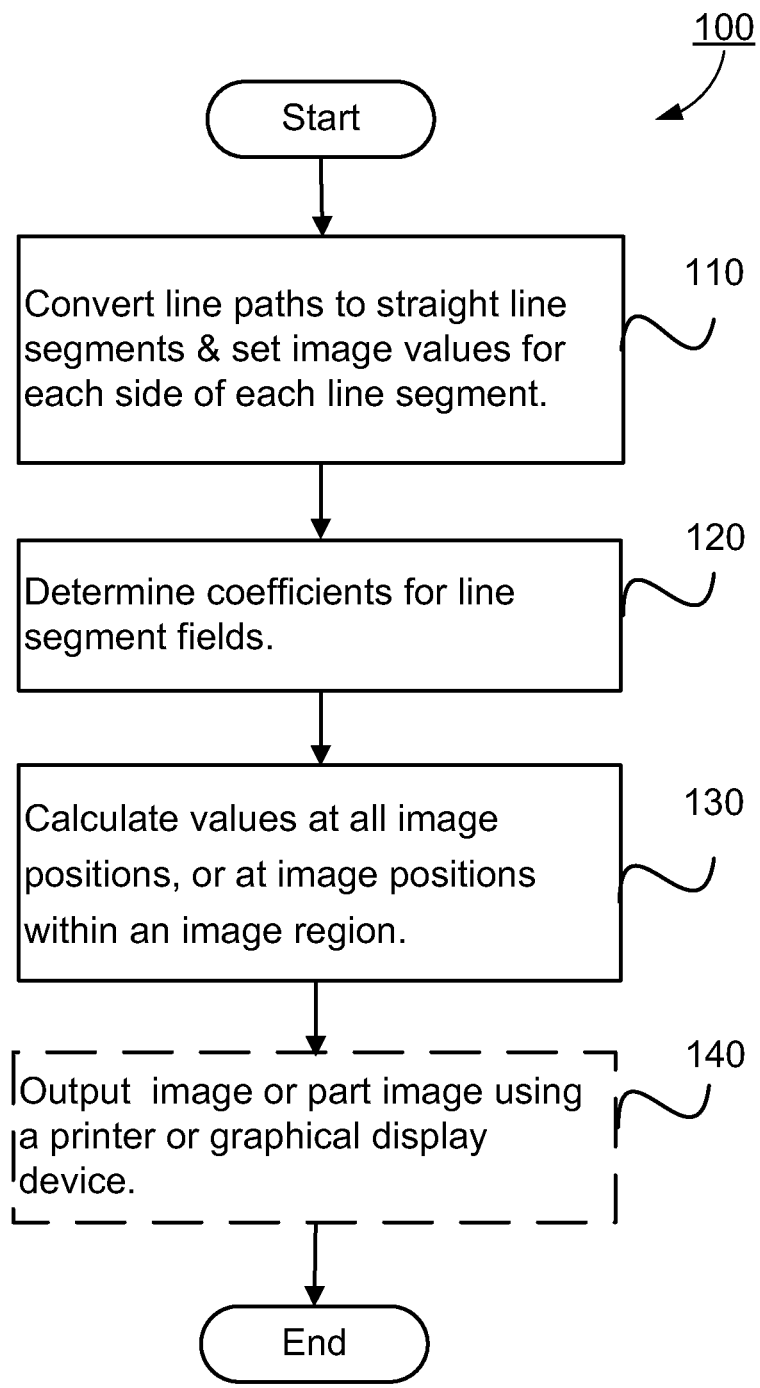
FIG. 1 is a schematic flow diagram showing the high-level operation of a piece-wise smooth image calculation method according to first and second embodiments of the invention.

Methods, apparatuses, and computer readable storage mediums for rendering a piece-wise smooth image are disclosed. In the following description, numerous specific details are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function(s) or operation(s), unless the contrary intention appears.

Without limiting the generality of the invention and for clarity of description, the embodiments of the invention are described hereinafter with reference to rendering a single colour component of a colour image. Multi-colour images can be obtained by rendering individual colour component images.

INTRODUCTION

Known methods of rendering graphic images, specified by colour values along opposite sides of paths, and which solve Laplace's equation, do so by iteratively updating unknown image values using neighbouring image values. A typical arrangement is for the image value of a pixel to be updated with the average of its four nearest neighbour pixels. The embodiments of the invention are based on a different approach, implementing a boundary element method to solve Laplace's equation.

The underlying principles for the embodiments of the invention are based on solutions of Laplace's equation in two dimensions (2D) with boundary constraints in the form of function values, i.e. colour component values, specified along the opposite sides of curves or "paths". Without loss of generality, a path is assumed not to self-intersect, with the exception that the start and end points of a path may be the same. A path with start and end points that are the same forms a loop and is called "closed". A path with different start and end points is called "open".

Laplace's equation in 2D can be expressed as:

$$\nabla^2 f(x, y) = \frac{\partial^2 f}{\partial x^2} + \frac{\partial^2 f}{\partial y^2} = 0 \qquad (1)$$

The real-valued solution to Laplace's equation in two dimensions with function values specified on opposite sides of open and closed paths is a function f(x, y) of two variables x and y, which can be expressed in the form:

$$f(x, y) = \sum_i \int_{Ci} \alpha_i(s) \frac{1}{\pi} \frac{\cos(\lambda_i(s))(y - y(s)) - \sin(\lambda_i(s))(x - x(s))}{(x - x(s))^2 + (y - y(s))^2} ds + \sum_i \int_{Ci} \beta_i(s) \frac{1}{2} \log((x - x(s))^2 + (y - y(s))^2) ds \qquad (2)$$

In this form, the solution f(x, y) of Laplace's equation (1) is the sum, for each path $C_i$ of a set of paths, of two types of integrals with respect to arc length s along a path. The first type of integral for a path $C_i$ is the superposition of 2D dipole potential fields, centered on the path and oriented normal to the path, which are weighted by a coefficient $\alpha_i$. The coefficient $\alpha_i$ and the orientation, expressed as angle $\lambda_i$, are functions of arc length. The second type of integral for a path $C_i$ is the superposition of 2D point source (i.e. logarithmic) potential fields, centered on the path, which are weighted by a coefficient $\beta_i$, which is also a function of arc length. The value at a position along a path of the first coefficient function $\alpha_i$, (s) is obtained directly from the difference between the boundary constraint function values on the opposing left and right sides of the path at the point along the path specified by s. The second coefficient function values $\beta_i$, (s) depend on both the boundary constraint function values and the arrangement of the paths.

In the embodiments of the invention, the solution f(x, y) is approximated by representing each path as a chain of short straight line segments, where each coefficient is assumed to be constant over each line segment. With this approximation, the solution has the form:

$$f(x, y) = \sum_i \alpha_i D_i(x, y) + \sum_i \beta_i L_i(x, y) \qquad (3)$$

where $D_i$ (x, y) is the value, at a field point (x, y), of the integral of unweighted dipole fields centered at points along the i'th straight line segment and oriented normal to the straight line segment to be positive on the left hand side of the straight line segment, and $L_i$ (x, y) is the value, at a field point (x, y), of the integral of unweighted logarithmic fields centered at points along the i'th straight line segment. Each path and each line segment has a start point and an end point. A forward direction along a path or a line moves from its start point to its end point. The left hand side and right hand side of a path or a straight line segment are determined based on the forward direction along the path or line segment.

In evaluating Equation (3), the coefficient $\alpha_i$ for the i'th straight line segment is obtained directly as half the difference of boundary constraint function values on the opposing left and right sides of the line segment as follows:

$$\alpha_i = \frac{{}_iC_L - {}_iC_R}{2}. \quad (4)$$

Here, ${}_ic_L$ is a representative value for the i'th straight line segment of the boundary constraint function values along the left of the segment's path in the vicinity of the segment. Similarly, ${}_ic_R$ is a representative value for the i'th straight line segment of the boundary constraint function values along the right of the segment's path in the vicinity of the segment.

The coefficients $\beta_i$ of Equation (3) depend on the boundary constraint function values and the arrangement of the paths. Suitable values for the coefficients $\beta_i$ are obtained by formulating and solving a linear system of equations as follows. Let $(x_i, y_i)$ be the midpoint of the i'th line segment. It is required that:

$$f(x_i, y_i) = \frac{{}_iC_L + {}_iC_R}{2}. \quad (5)$$

That is, the approximating function of Equation (3) is required to have a value at the centre of each line segment that is the average of the left and right colour values for that line segment. If the number of straight line segments is M, this gives M linear equations for the M unknown values $\beta_i$ with the i'th equation being:

$$\sum_j \beta_j L_j(x_i, y_i) = \frac{{}_iC_L + {}_iC_R}{2} - \sum_j \alpha_j D_j(x_i, y_i). \quad (6)$$

This system of linear equations can be solved to find the coefficients $\beta_i$.

Rather than representing the solution f(x, y) using Equation (3) it can also be advantageous, as explained later, to represent the solution in the alternative form $$f(x, y) = \sum_i \alpha_i D_i(x, y) + \sum_i \beta_i L_i(x, y) + c \quad (7)$$

where c is a constant value. When the solution is represented using this alternative form, the constant c and the M coefficients $\beta_i$ for line segment logarithmic fields, being M+1 unknowns, are determined by solving the linear system of M+1 equations consisting of the equation $$\sum_i \beta_i L_i(x_i, y_i) = 0 \quad (8)$$

and the M equations $$\sum_j \beta_j L_j(x_i, y_i) = \frac{{}_iC_L + {}_iC_R}{2} - \sum_j \alpha_j D_j(x_i, y_i) - c. \quad (9)$$

These and other aspects of the embodiments of the invention are described in detail hereinafter. Before doing so, a description of a general-purpose computer system is set forth. The embodiments of the invention may be implemented using such a computer system.

[Computer System]

Figure 8A:
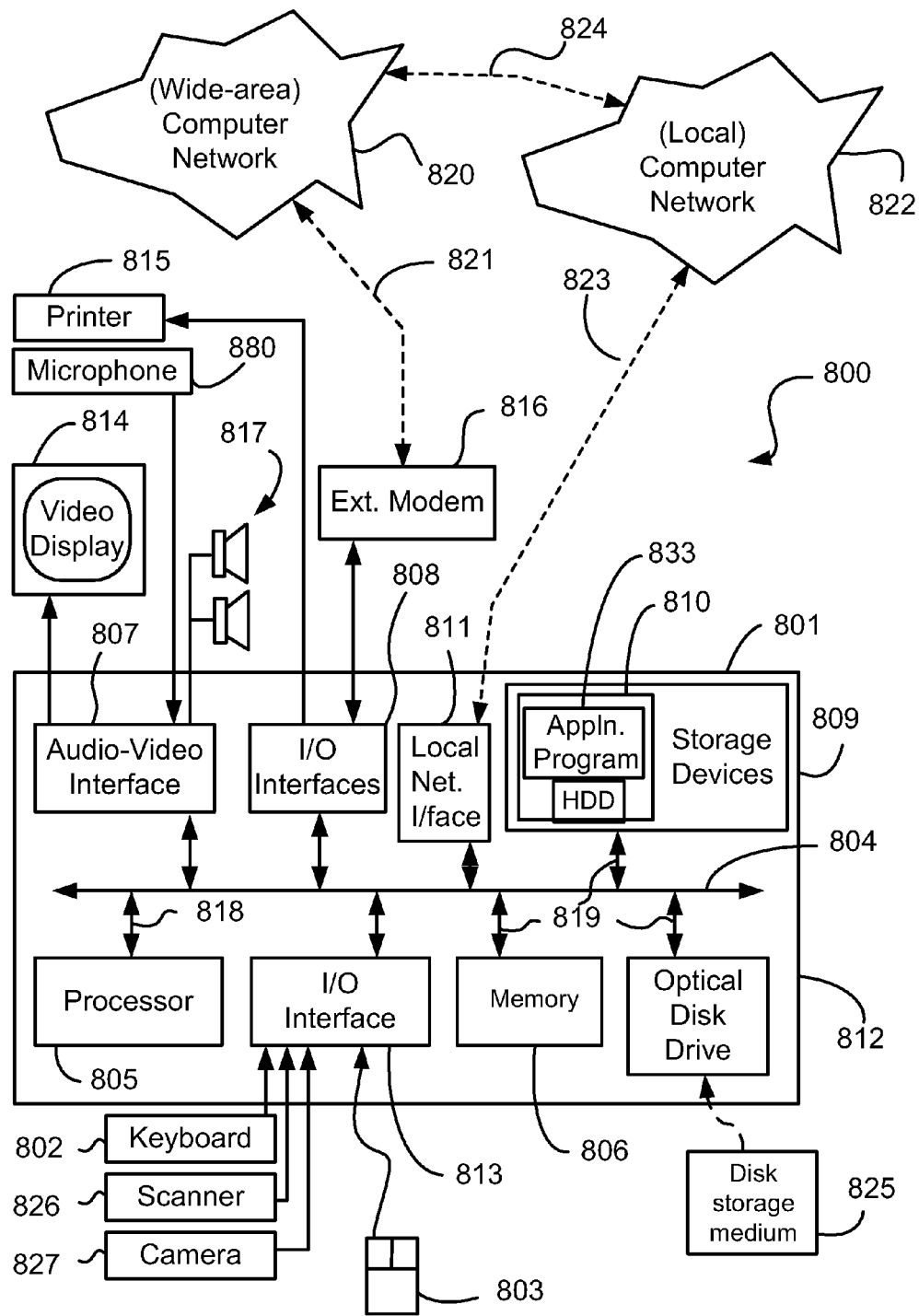
FIGS. 8A and 8B are schematic block diagrams illustrating a general-purpose computer system upon which the arrangements described can be practised.
Figure 8B:
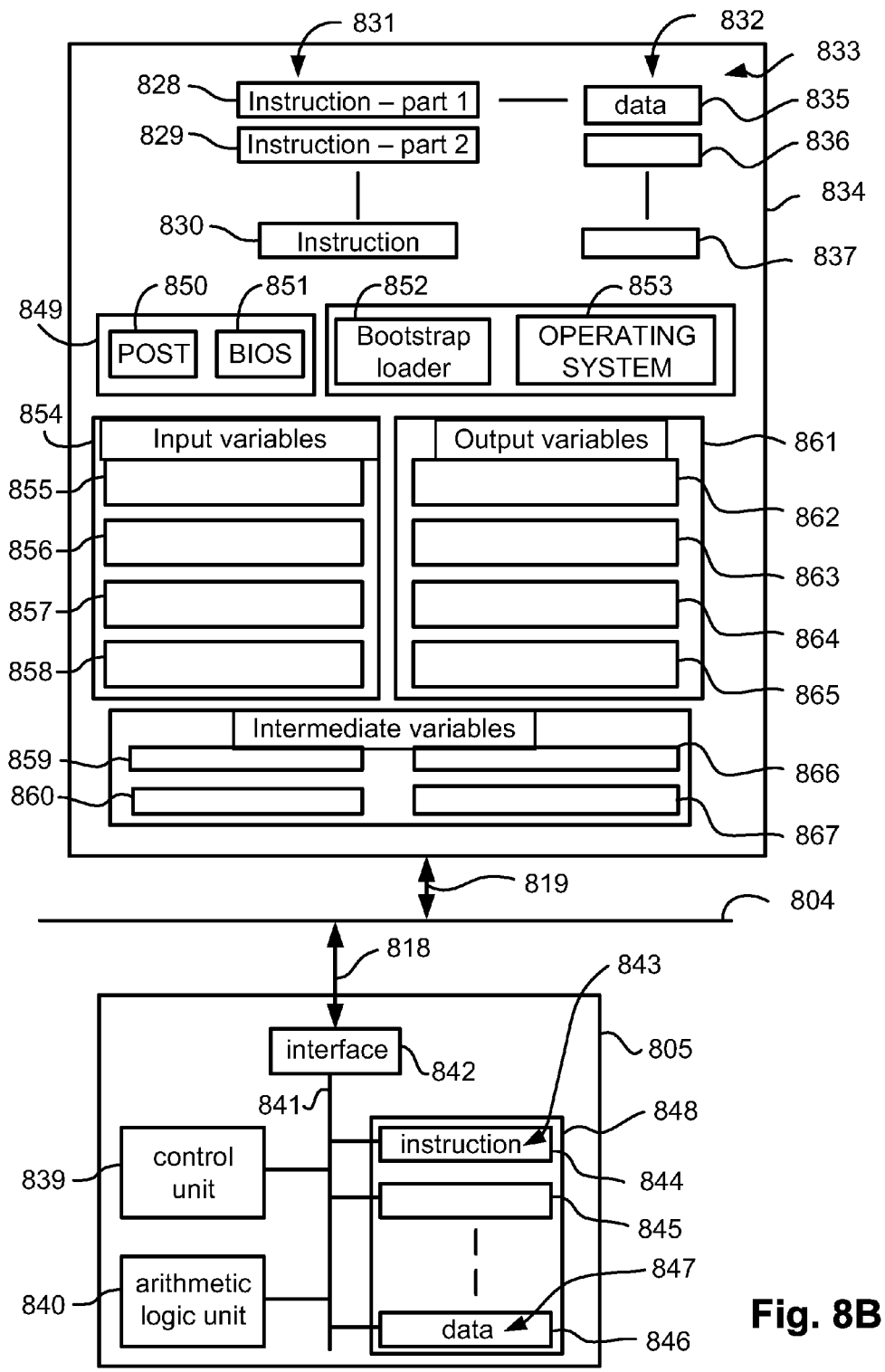

FIGS. 8A and 8B collectively form a schematic block diagram of a general purpose computer system 800, upon which the various arrangements described can be practiced.

As depicted in FIG. 8A, the computer system 800 is formed by a computer module 801, input devices such as a keyboard 802, a mouse pointer device 803, a scanner 826, a camera 827, and a microphone 880, and output devices including a printer 815, a display device 814 and loudspeakers 817. An external Modulator-Demodulator (Modem) transceiver device 816 may be used by the computer module 801 for communicating to and from a communications network 820 via a connection 821. The network 820 may be a wide-area network (WAN), such as the Internet or a private WAN. Where the connection 821 is a telephone line, the modem 816 may be a traditional "dial-up" modem. Alternatively, where the connection 821 is a high capacity (e.g., cable) connection, the modem 816 may be a broadband modem. A wireless modem may also be used for wireless connection to the network 820.

The computer module 801 typically includes at least one processor unit 805, and a memory unit 806 for example formed from semiconductor random access memory (RAM) and semiconductor read only memory (ROM). The module 801 also includes an number of input/output (I/O) interfaces including an audio-video interface 807 that couples to the video display 814, loudspeakers 817 and microphone 880, an I/O interface 813 for the keyboard 802, mouse 803, scanner 826, camera 827 and optionally a joystick (not illustrated), and an interface 808 for the external modem 816 and printer 815. In some implementations, the modem 816 may be incorporated within the computer module 801, for example within the interface 808. The computer module 801 also has a local network interface 811 which, via a connection 823, permits coupling of the computer system 800 to a local computer network 822, known as a Local Area Network (LAN). As also illustrated, the local network 822 may also couple to the wide network 820 via a connection 824, which would typically include a so-called "firewall" device or device of similar functionality. The interface 811 may be formed by an Ethernet™ circuit card, a Bluetooth™ wireless arrangement or an IEEE 802.11 wireless arrangement.

The interfaces 808 and 813 may afford either or both of serial and parallel connectivity, the former typically being implemented according to the Universal Serial Bus (USB) standards and having corresponding USB connectors (not illustrated). Storage devices 809 are provided and typically include a hard disk drive (HDD) 810. Other storage devices such as a floppy disk drive and a magnetic tape drive (not illustrated) may also be used. An optical disk drive 812 is typically provided to act as a non-volatile source of data. Portable memory devices, such optical disks (e.g., CD-ROM, DVD), USB-RAM, and floppy disks for example may then be used as appropriate sources of data to the system 800.

The components 805 to 813 of the computer module 801 typically communicate via an interconnected bus 804 and in a manner which results in a conventional mode of operation of the computer system 800 known to those in the relevant art. Examples of computers on which the described arrangements can be practised include IBM-PC's and compatibles, Sun Sparcstations, Apple Mac™ or a like computer systems evolved therefrom.

Figure 5:
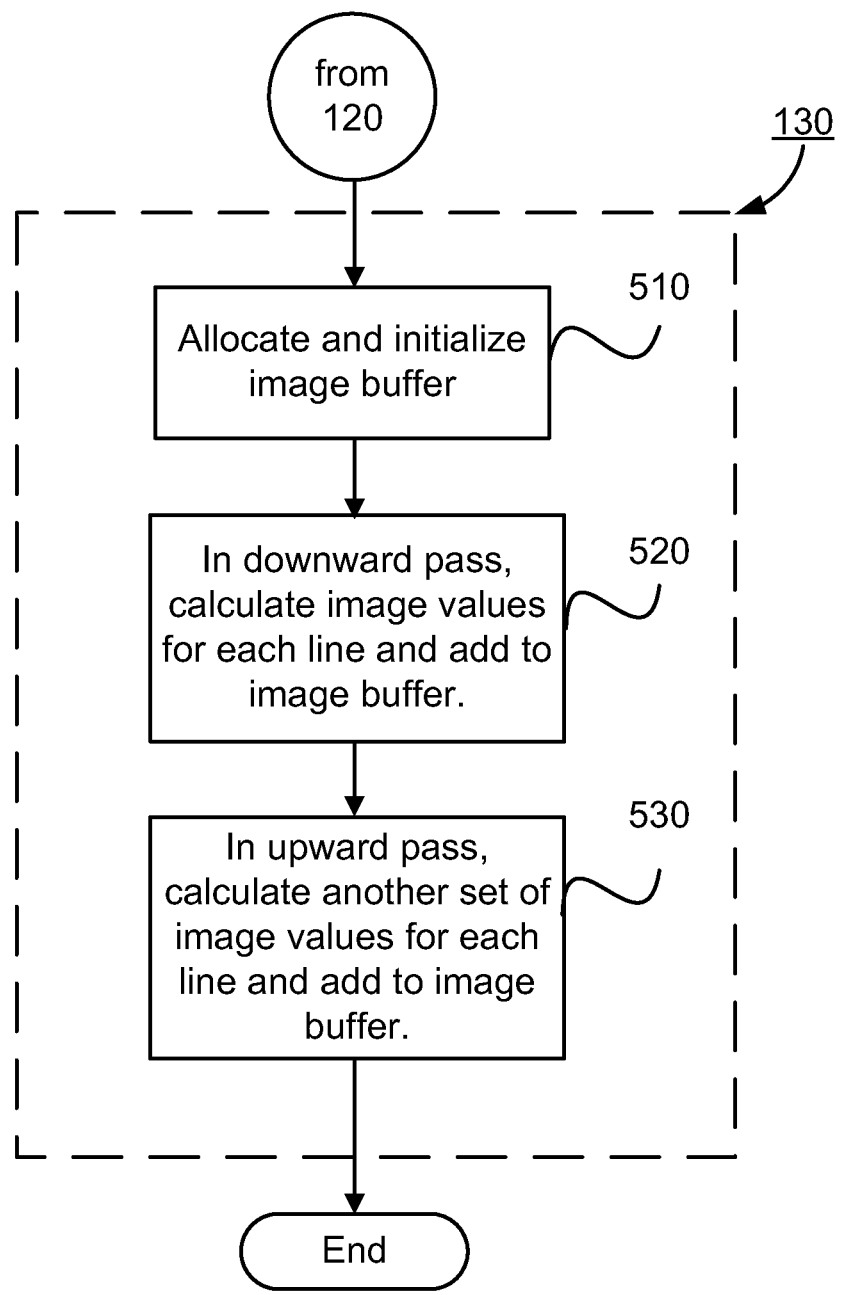
FIG. 5 is schematic flow diagram showing the high-level operation of the rendering step of the image calculation method of the second embodiment.

The method of rendering a piece-wise smooth image may be implemented using the computer system 800, in which the processes of FIGS. 1, 5 and 6 may be implemented as one or more software application programs 833 executable within the computer system 800. In particular, the steps of the method of rendering a piece-wise smooth image are effected by instructions 831 in the software 833 that are carried out within the computer system 800. The software instructions 831 may be formed as one or more code modules, each for performing one or more particular tasks. The software may also be divided into two separate parts, in which a first part and the corresponding code modules performs the rendering methods and a second part and the corresponding code modules manage a user interface between the first part and the user.

The software 833 is generally loaded into the computer system 800 from a computer readable medium, and is then typically stored in the HDD 810, as illustrated in FIG. 8A, or the memory 806, after which the software 833 can be executed by the computer system 800. In some instances, the application programs 833 may be supplied to the user encoded on one or more CD-ROM 825 and read via the corresponding drive 812 prior to storage in the memory 810 or 806. Alternatively the software 833 may be read by the computer system 800 from the networks 820 or 822 or loaded into the computer system 800 from other computer readable media. Computer readable storage media refers to any storage medium that participates in providing instructions and/or data to the computer system 800 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 801. Examples of computer readable transmission media that may also participate in the provision of software, application programs, instructions and/or data to the computer module 801 include radio or infra-red transmission channels as well as a network connection to another computer or networked device, and the Internet or Intranets including e-mail transmissions and information recorded on Websites and the like.

The second part of the application programs 833 and the corresponding code modules mentioned above may be executed to implement one or more graphical user interfaces (GUIs) to be rendered or otherwise represented upon the display 814. Through manipulation of typically the keyboard 802 and the mouse 803, a user of the computer system 800 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 817 and user voice commands input via the microphone 880.

FIG. 8B is a detailed schematic block diagram of the processor 805 and a "memory" 834. The memory 834 represents a logical aggregation of all the memory devices (including the HDD 810 and semiconductor memory 806) that can be accessed by the computer module 801 in FIG. 8A.

When the computer module 801 is initially powered up, a power-on self-test (POST) program 850 executes. The POST program 850 is typically stored in a ROM 849 of the semiconductor memory 806. A program permanently stored in a hardware device such as the ROM 849 is sometimes referred to as firmware. The POST program 850 examines hardware within the computer module 801 to ensure proper functioning, and typically checks the processor 805, the memory (809, 806), and a basic input-output systems software (BIOS) module 851, also typically stored in the ROM 849, for correct operation. Once the POST program 850 has run successfully, the BIOS 851 activates the hard disk drive 810. Activation of the hard disk drive 810 causes a bootstrap loader program 852 that is resident on the hard disk drive 810 to execute via the processor 805. This loads an operating system 853 into the RAM memory 806 upon which the operating system 853 commences operation. The operating system 853 is a system level application, executable by the processor 805, to fulfil various high level functions, including processor management, memory management, device management, storage management, software application interface, and generic user interface.

The operating system 853 manages the memory (809, 806) in order to ensure that each process or application running on the computer module 801 has sufficient memory in which to execute without colliding with memory allocated to another process. Furthermore, the different types of memory available in the system 800 must be used properly so that each process can run effectively. Accordingly, the aggregated memory 834 is not intended to illustrate how particular segments of memory are allocated (unless otherwise stated), but rather to provide a general view of the memory accessible by the computer system 800 and how such is used.

The processor 805 includes a number of functional modules including a control unit 839, an arithmetic logic unit (ALU) 840, and a local or internal memory 848, sometimes called a cache memory. The cache memory 848 typically includes a number of storage registers 844-846 in a register section. One or more internal buses 841 functionally interconnect these functional modules. The processor 805 typically also has one or more interfaces 842 for communicating with external devices via the system bus 804, using a connection 818.

The application program 833 includes a sequence of instructions 831 that may include conditional branch and loop instructions. The program 833 may also include data 832 which is used in execution of the program 833. The instructions 831 and the data 832 are stored in memory locations 828-830 and 835-837 respectively. Depending upon the relative size of the instructions 831 and the memory locations 828-830, a particular instruction may be stored in a single memory location as depicted by the instruction shown in the memory location 830. Alternately, an instruction may be segmented into a number of parts each of which is stored in a separate memory location, as depicted by the instruction segments shown in the memory locations 828-829.

In general, the processor 805 is given a set of instructions which are executed therein. The processor 805 then waits for a subsequent input, to which it reacts to by executing another set of instructions. Each input may be provided from one or more of a number of sources, including data generated by one or more of the input devices 802, 803, data received from an external source across one of the networks 820, 822, data retrieved from one of the storage devices 806, 809 or data retrieved from a storage medium 825 inserted into the corresponding reader 812. The execution of a set of the instructions may in some cases result in output of data. Execution may also involve storing data or variables to the memory 834.

The disclosed rendering arrangements use input variables 854, which are stored in the memory 834 in corresponding memory locations 855-858. The rendering arrangements produce output variables 861 that are stored in the memory 834 in corresponding memory locations 862-865. Intermediate variables may be stored in memory locations 859, 860, 866 and 867.

The register section 844-846, the arithmetic logic unit (ALU) 840, and the control unit 839 of the processor 805 work together to perform sequences of micro-operations needed to perform "fetch, decode, and execute" cycles for every instruction in the instruction set making up the program 833. Each fetch, decode, and execute cycle comprises:

(a) a fetch operation, which fetches or reads an instruction 831 from a memory location 828;

(b) a decode operation in which the control unit 839 determines which instruction has been fetched; and (c) an execute operation in which the control unit 839 and/or the ALU 840 execute the instruction.

Thereafter, a further fetch, decode, and execute cycle for the next instruction may be executed. Similarly, a store cycle may be performed by which the control unit 839 stores or writes a value to a memory location 832.

Each step or sub-process in the processes of FIGS. 1, 5 and 6 is associated with one or more segments of the program 833, and is performed by the register section 844-847, the ALU 840, and the control unit 839 in the processor 805 working together to perform the fetch, decode, and execute cycles for every instruction in the instruction set for the noted segments of the program 833.

The method of rendering a piece-wise smooth image may alternatively be implemented in dedicated hardware such as one or more integrated circuits performing the functions or sub functions of rendering a piece-wise smooth image. Such dedicated hardware may include graphic processors, digital signal processors, or one or more microprocessors and associated memories.

[Rendering Process]

FIG. 1 is a schematic flow diagram of a piece-wise smooth image rendering method 100 according to a first embodiment of the invention. In this method 100, values of a single colour component of a piece-wise smooth image are calculated using the processor 805, consistent with specified image values along either side of specified line paths, such that image values between the line paths approximate a solution of Laplace's equation.

The input data for the calculation method 100 comprises specification of line paths, and specification of image values along the left hand side and the right hand side of the line paths as a function of length along the curves. By way of example, the line paths can be specified in the form of Bezier curves, and the left and right hand side image values for each curve can be specified as a function of the Bezier curve parameter. The input data may be stored in memory 806 of FIG. 8A.

Figure 2:
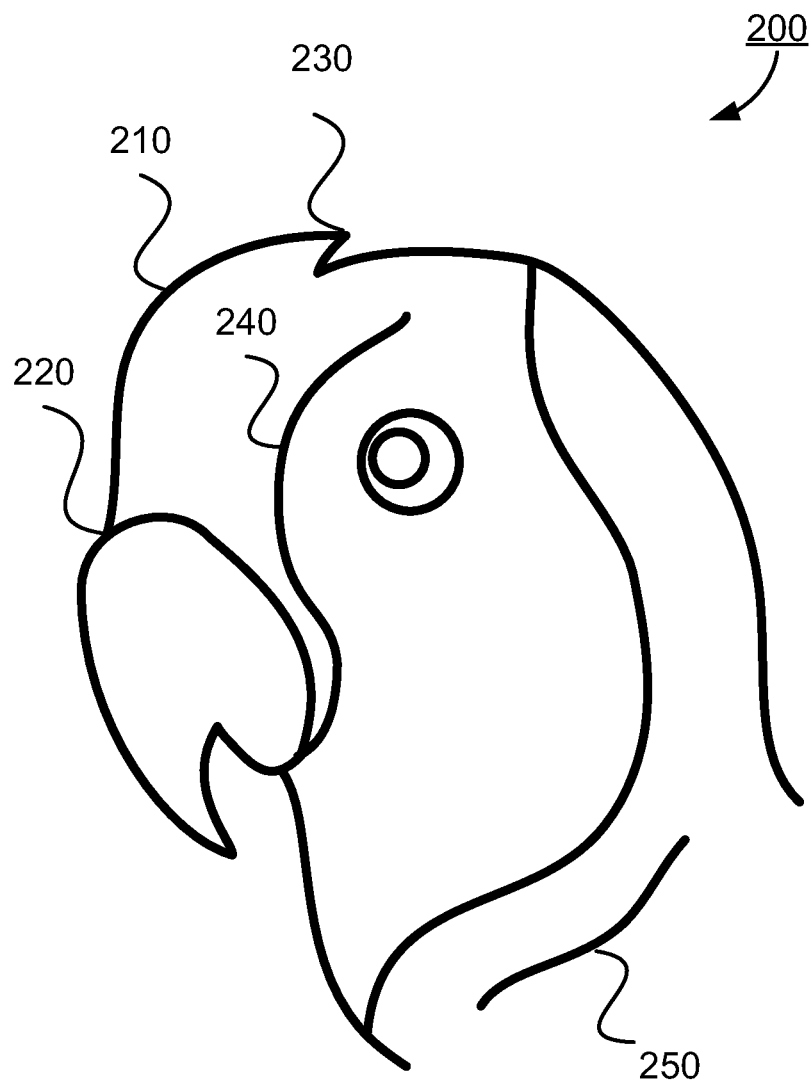
FIG. 2 is an example line-art drawing consisting of multiple line paths which together with image values supplied along opposite sides of line paths constitute an input specification of a piece-wise smooth graphic image.

FIG. 2 shows a collection of line paths including line paths 210, 240, 250, forming a drawing of a parrot's head. An example line path is the Bezier curve 210 with end points 220 and 230. As is the case for line path 210, line paths may connect at their end points to other line paths. On the other hand, the end points of line paths may be separated from other line paths, as is the case for one end point of line path 240 and for both end points of line path 250. In this way, the collection of line paths may form closed or open boundaries.

Figure 3:
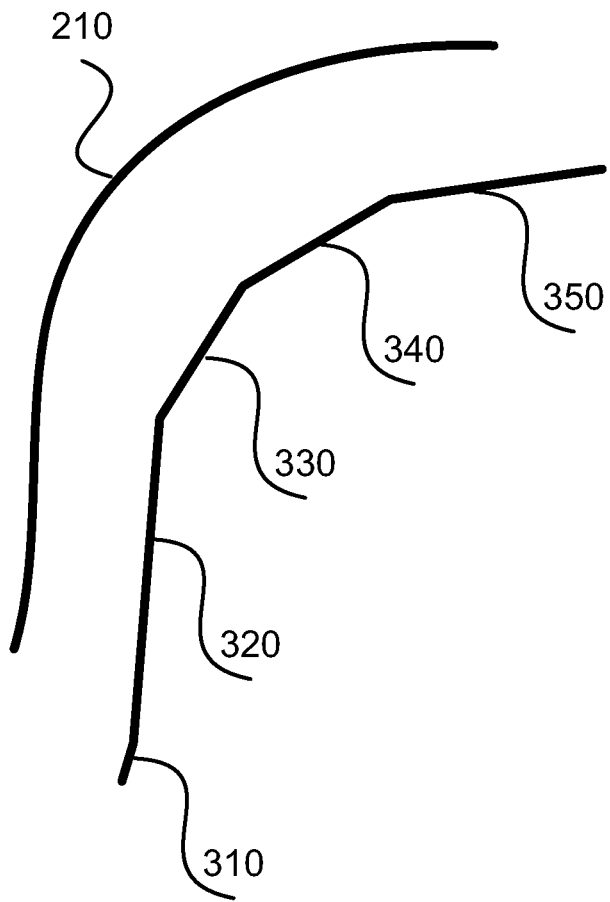
FIG. 3 is a diagram showing an example curved line path of FIG. 2 together with an example conversion of the curved line path into a chain of straight line segments.

The method 100 commences at step 110. In step 110 of FIG. 1, line paths are converted by the processor 805 to straight line segments and image values are specified or set for each side of each line segment. Each line path is approximated as a sequence of connected straight line segments, and representative image values are set for each side of each straight line segment. FIG. 3 is an expanded view of an example of the polygonization of the curved line path 210 of FIG. 2, together with an approximating chain of five straight line segments 310, 320, 330, 340 and 350. The calculation of such a piece-wise linear approximation, or polygonal chain, of a Bezier curve can be performed by recursive subdivision or other methods.

Generally to minimize the overall calculation load in rendering a piece-wise smooth image from image values along paths according to Equation (3) or Equation (7), each curved line path is preferably represented with a minimum number of straight line segments. This reduces the number of coefficients of logarithmic potential fields for line segments and therefore also reduces the size of the linear system of equations in these coefficients. This also reduces the number of line segment potential field values contributing to the calculation of the solution image at any particular image position.

On the other hand, in general, to represent curved lines accurately, a higher number of straight line segments are required. Given a particular resolution (i.e. pixel density or pixel separation), beyond a certain number of straight line segments, however, there is little appreciable improvement in the reproduction of curved lines.

The conversion of curved line paths into chains of straight line segments should therefore be controlled to balance accuracy of reproduction and computation load. More accurate results for less computation can be obtained by having a lower density of straight line segments in less highly curved sections of curved line paths.

In step 110, as well as converting curved line paths to straight line segments, image values are set using the processor 805 for each side of each line segment. The two opposite sides of a straight line segment are referred to as the left and right sides of a line segment. The image values for the left side and the right side of each straight line segment are set to be representative of the image values of the opposing sides of the corresponding section of the line path from which the line segment is derived. Where left and right image values vary along a line path, more accurate results are obtained in the final rendered piece-wise smooth image by converting the line path to a higher number of straight line segments. Once again, the competing goals of maximizing accuracy and minimizing computation load should be balanced, and again, more accurate results for less computation can be obtained by having a lower density of straight line segments in sections of line paths where the specified left and right image values vary less rapidly.

Referring again to FIG. 1, in step 120, coefficients are determined by the processor 805 for line segment fields. A dipole field coefficient and a log field coefficient are determined for each straight line segment. As described hereinbefore, the dipole field coefficient $\alpha_i$ for each straight line segment i is calculated according to Equation (4) simply as half the difference of the segment's opposing left and right image values.

Also as described hereinbefore, the log field coefficient $\beta_i$ for each straight line segment i is calculated by formulating and solving the linear system of Equations (6) or the alternative linear system of Equations (8) and (9). In formulating either of these linear systems of equations, values of dipole potential field functions and logarithmic potential field functions for each segment j are calculated at the centre of each segment i.

The integral at a field point (x, y) of dipole fields, positioned with uniform density along the directed straight line segment from endpoint $(x_1, y_1)$ to endpoint $(x_2, y_2)$ and oriented normal to the straight line to be positive on the left hand side, is equal to the angular rotation, in units of half revolutions, from the vector $(x-x_1, y-y_1)$ to the vector $(x-x_2, y-y_2)$, which can be expressed as:

$$D_i(x, y) = \frac{1}{\pi}(\text{atan2}(v - v_2, u - u_2) - \text{atan2}(v - v_1, u - u_1)). \quad (10)$$

On the right hand side of Equation (10), the field point and straight line segments end points are expressed in a co-ordinate system (u, v), which has axes that are rotated from the (x, y) co-ordinate system axes by an angle λ, so that the u axis is oriented in the same direction as the vector from line segment endpoint $(x_1, y_1)$ to endpoint $(x_2, y_2)$. That is, $$u = x \cdot \cos(\lambda) + y \cdot \sin(\lambda)$$

$$v = -x \cdot \sin(\lambda) + y \cdot \cos(\lambda) \quad (11)$$

where $$\lambda = a \tan 2(y_2 - y, x_2 - x_1). \quad (12)$$

The integral at a field point (x, y) of dipole fields, positioned along the directed straight line segment from endpoint $(x_1, y_1)$ to the endpoint $(x_2, y_2)$ can equivalently be expressed using a vector cross product and a vector dot product of vectors $(x-x_1, y-y_1)$ and $(x-x_2, y-y_2)$ as:

$$D_i(x, y) = \frac{1}{\pi}\text{atan2}((x - x_1)(y - y_2) - (y - y_1)(x - x_2), \quad (13)$$
$$(x - x_1)(x - x_2) + (y - y_1)(y - y_2))$$

$D_i$ (x, y) is continuous everywhere except at points on the straight line edge segment. Immediately to the left of the straight line segment $D_i$ (x, y) has a limiting value of 1, and immediately to the right it has a limiting value of −1. The value of $D_i$ (x, y) at points on the straight line segment is defined to be zero.

The integral of a logarithmic field, at a field point (x, y), over a straight line segment from point $(x_1, y_1)$ to point $(x_2, y_2)$ can be expressed as:

$$L(x, y) = (u - u_2)\left(\frac{1}{2}\log((u - u_2)^2 + (v - v_2)^2) - 1\right) + \quad (14)$$
$$(v - v_2)\text{atan2}(v - v_2, u - u_2) -$$
$$(u - u_1)\left(\frac{1}{2}\log((u - u_1)^2 + (v - v_1)^2) - 1\right) +$$
$$(v - v_1)\text{atan2}(v - v_1, u - u_1)$$

Here again, as in Equation (10), the (u, v) values are obtained from corresponding (x, y) values by the rotation of co-ordinates expressed by Equations (11) and (12). The function L(x, y) is continuous everywhere and has a single, finite extreme value at the midpoint of the straight line segment.

In step 120 of FIG. 1, log field coefficients are determined or calculated using the processor 805 by solving the linear system of Equations (6) or alternative linear system of Equations (8) and (9), in which segment dipole and segment logarithmic potential field function values are calculated using Equations (13) and (14).

In step 130, values at all image positions (or values at image positions within an image region, for example, a rectangular section of the image) are calculated using the processor 805 and memory 806. The values are calculated according to Equation (3) or Equation (7) using the coefficients $\alpha_i$ and $\beta_i$, which have been calculated for each line segment i, and segment dipole and segment logarithmic field function values calculated using Equations (13) and (14). The values calculated in step 130 are used to output the image (or part of the image). Step 140 is shown with broken lines. Step 140 outputs the image or part image using a printer or graphical display device. For example, the rendered image may be output to video display device 814 and/or printer 815 of FIG. 8.

If the number of pixels in the image is N, calculating the piece-wise smooth colour image using Equation (3) or Equation (7) requires M×N evaluations of values of line segment dipole potential field functions $D_i$ (x, y), and M×N evaluations of values of line segment logarithmic potential field functions $L_i$ (x, y). When both M and N are large, this method of calculating a piece-wise image is likely to be slow. So this first embodiment is suited to calculation of piece-wise smooth images, where the number of line segments is small or where it is only required to calculate a small image or a small section of an image.

A solution to Laplace's equation having specified values along paths according to Equation (3) or Equation (7) can be calculated much more efficiently by treating the solution as a function, which is periodic in one dimension, using dipole potential functions and logarithmic potential functions which are periodic in one dimension, and using 1D cyclic convolution to generate values of the function with line-by-line processing. This efficient calculation is the basis for the second embodiment.

In the second embodiment, as in the first embodiment, each line segment is associated with a dipole field coefficient and a logarithmic field coefficient and the resulting piece-wise smooth image is a weighted sum of dipole fields and logarithmic fields according to either Equation (3) or Equation (7).

Figure 4:
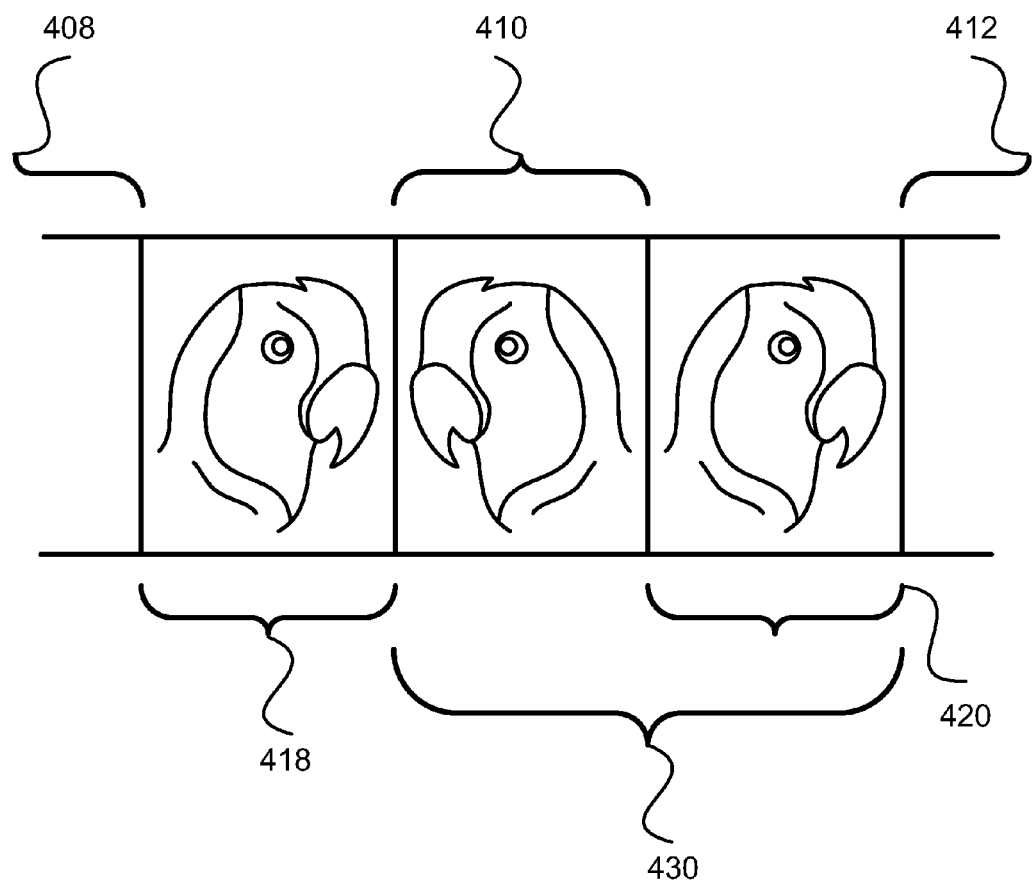
FIG. 4 is a diagram showing an arrangement of copies and horizontally flipped copies of the line-art drawing of FIG. 2 that is used to illustrate the line-by-line calculation of a piece-wise smooth image of the second embodiment.

FIG. 4 illustrates the representation of the solution as a function which is periodic in one dimension. FIG. 4 shows the same line-art 410 (200) of FIG. 2, and a horizontally flipped copy, periodically repeated horizontally. The line-art within the rectangular region 410 represents a collection of line paths for which a piece-wise smooth image having specified image values along opposite sides of the line paths must be generated in the region 410. Horizontally flipped copies of the image are positioned within rectangular regions 418 and 420. Copies of the image, without any flipping, are considered to be positioned within the rectangular regions 408 and 412. An alternating sequence of images and flipped images is considered to extend indefinitely to the left and right. Each horizontal line of this alternating sequence of images is a periodic signal, which in each period contains values for the image and values for a reflected copy of the image. A pair of images, for example the pair of images indicated as 430 in FIG. 4 comprising image 410 and its flipped copy 420, together form an extended image which is one period of the periodic image.

The second embodiment can be practised using either of two formulations of the solution to Laplace's equation. In the first formulation, each of the flipped copies of the image has values which are the same magnitude and sign as values at corresponding positions in the un-flipped image. In this case, the sequence of images is a symmetric periodic extension of the single image to be solved. In this formulation, the horizontal derivatives of image values are zero at the left and right borders of un-flipped and flipped image copies. This is a solution of Laplace's equation with so-called Neumann boundary conditions at left and right image borders. In this Neumann formulation, the piece-wise smooth image is calculated according to Equation (7) with the log field coefficients $\beta_i$ and the constant 'c' calculated according to the alternative linear system of Equations (8) and (9). Equation (8) ensures that logarithmic fields with positive coefficients balance logarithmic fields with negative coefficients so that the net contribution to image values from logarithmic fields tends to zero as the absolute value of the y co-ordinate becomes large.

In the second formulation, each of the flipped copies of the image has values which are the same magnitude but opposite sign as values at corresponding positions in the image. In this case the sequence of images is an anti-symmetric periodic extension of the single image to be solved. In this formulation, image values are zero at the left and right borders of un-flipped and flipped image copies. This is a solution of Laplace's equation with so-called Dirichlet boundary conditions at left and right image borders. In this Dirichlet formulation, the piece-wise smooth image can be calculated according to Equation (3) with the log field coefficients $\beta_i$ calculated according to the linear system of Equations (6). Alternatively, in the Dirichlet formulation, the piece-wise smooth image can be calculated according to Equation (7) with the log field coefficients $\beta_i$ and the constant 'c' calculated according to the alternative linear system of Equations (8) and (9).

The periodic dipole potential functions, the periodic logarithmic potential functions and the 1D convolution, which constitute the basis of the second embodiment, are described hereinafter.

Here the following form of the 1D Fourier Transform is used:

$$f(x) = \frac{1}{2\pi}\int_{-\infty}^{\infty} F(\omega)e^{i\omega x}dw \stackrel{x}{\rightleftharpoons} F(\omega) = \int_{-\infty}^{\infty} f(x)e^{-i\omega x}dx. \quad (15)$$

Firstly, aperiodic dipole and logarithmic potential functions are considered. In particular, the 1D Fourier Transforms in the x dimension of the 2D dipole potential function and the 2D logarithmic (point source) potential functions are given by:

$$\frac{1}{\pi}\frac{\cos(\lambda)y - \sin(\lambda)x}{x^2 + y^2} \stackrel{x}{\rightleftharpoons} (\cos(\lambda) + i\,\mathrm{sign}(\omega)\sin(\lambda))e^{-y|\omega|} \quad (16)$$

$$\frac{1}{2\pi}\log(x^2 + y^2) \stackrel{x}{\rightleftharpoons} -\frac{e^{-y|\omega|}}{|\omega|}, \text{ for } \omega \neq 0 \quad (17)$$

Also the Fourier Transform of the Cauchy distribution, with scale parameter y, is given by:

$$\frac{1}{\pi}\frac{y}{x^2+y^2} \rightleftharpoons e^{-y|\omega|} \quad (18)$$

From the convolution property of the Fourier Transform and the above Fourier Transform pairs, it can be seen that values of the dipole potential function and the logarithmic potential function along lines parallel to the x axis, i.e. with constant y co-ordinate, can be generated from an initial line of values, with smaller y co-ordinate value, by convolution or repeated convolution with a Cauchy distribution. This property of the Cauchy distribution, that the Cauchy distribution generates these 2D functions from a 1D set of values, is the basis for the efficient methods described hereinafter to calculate images formed by superposition of dipole potential fields and logarithmic potential fields.

To perform accurate convolution operations with finite length sequences of values, cyclic convolution is used together with versions of the dipole potential field and the logarithmic potential field which are periodic in the x co-ordinate:

$$\frac{\cos(\lambda)\sinh(2\pi y) - \sin(\lambda)\sin(2\pi x)}{\cosh(2\pi y) - \cos(2\pi x)} \stackrel{x}{\rightleftharpoons} \quad (19)$$
$$(\cos(\lambda) + i\,\mathrm{sign}(\omega)\sin(\lambda))e^{-y|\omega|}III\!\left(\frac{\omega}{2\pi}\right)$$

$$\frac{1}{2\pi}\log(\cosh(2\pi y) - \cos(2\pi x)) \stackrel{x}{\rightleftharpoons} -\frac{e^{-y|\omega|}}{|\omega|}III\!\left(\frac{\omega}{2\pi}\right), \text{ for } \omega \neq 0 \quad (20)$$

This dipole potential field function and logarithmic potential field function are derived from the aperiodic functions of Equations (16) and (17) by convolution in the spatial domain with the 'shah' or 'comb' sampling function:

$$III(x) = \sum_{m\in Z}\delta(x-m) \stackrel{x}{\rightleftharpoons} III\!\left(\frac{\omega}{2\pi}\right) = 2\pi\sum_{m\in Z}\delta(\omega - 2\pi m) \quad (21)$$

which is an infinite sum of uniformly separated delta functions.

The spatial domain function of Equation (19) can be obtained from the spatial domain function of Equation (16) using the well-known formula $$\cot(z) = \frac{1}{z} + \sum_{n=1}^{\infty}\left(\frac{1}{z-n\pi} + \frac{1}{z+n\pi}\right) \quad (22)$$

and the identity $$\cot(z) = \frac{\sin 2x - i\sinh 2y}{\cosh 2y - \cos 2x} \quad (23)$$

where z=x+iy.

Values of the periodic dipole potential field of Equation (19), uniformly sampled over one period with spacing 1/X, along lines of constant y co-ordinate value, can be generated, to a close approximation, from uniformly sampled values with spacing 1/X of the same periodic potential field for one period, along a line of smaller y co-ordinate value, by repeated cyclic convolution with the following sequence having period X, where X is an odd integer:

$$h[k] = \frac{1}{X}\frac{\sinh\!\left(\frac{2\pi}{X}\right) - (-1)^k 2e^{-\pi}\sinh\!\left(\frac{\pi}{X}\right)\cos\!\left(\frac{\pi k}{X}\right)}{\cosh\!\left(\frac{2\pi}{X}\right) - \cos\!\left(\frac{2\pi k}{N}\right)}. \quad (24)$$

This periodic sequence is obtained by evaluating the following band-limited function having period X, where X is an odd integer, at y=1/X and at integer values of x:

$$\frac{1}{X} \frac{\sinh(2\pi y) - 2e^{-\pi y X} \begin{pmatrix} \sinh(\pi y)\cos(\pi x)\cos\left(\frac{\pi x}{X}\right) - \\ \cosh(\pi y)\sin(\pi x)\sin\left(\frac{\pi x}{X}\right) \end{pmatrix}}{\cosh(2\pi y) - \cos\left(\frac{2\pi x}{X}\right)} \stackrel{x}{\rightleftharpoons} \quad (25)$$

$$e^{-y|\omega|} \frac{2\pi}{X} \sum_{m=-\frac{X-1}{2}}^{m=\frac{X-1}{2}} \delta\left(\omega - m\frac{2\pi}{X}\right)$$

This periodic sequence is chosen because the sequence has frequency domain characteristics that are similar to those of a Cauchy distribution Importantly, this periodic sequence has frequency coefficients that reduce exponentially with increasing frequency and the sequence preserves its form under self-convolution.

In the Neumann formulation of the second embodiment, whenever there are contributions to the values of the periodic image, as depicted in FIG. 4, from a periodic logarithmic potential field, there are equal magnitude and same signed contributions to image values from a corresponding periodic logarithmic potential field. Assuming that, the centre line of the pair of images forming one period of the periodic image is at x=0, the combined periodic logarithmic potential field, consisting of a periodic logarithmic field and its corresponding periodic logarithmic field, can be written:

$$\frac{1}{2\pi} \log(\cosh(2\pi y) - \cos(2\pi(x-a))) + \frac{1}{2\pi}\log(\cosh(2\pi y) - \cos(2\pi(x+a))) \quad (26)$$

where 'a' measures the displacement of the field's source points from the centre line.

Values for this symmetric combined periodic logarithmic potential field, along lines of constant y co-ordinate value, can be generated, to a close approximation, from uniformly sampled values of the same combined periodic potential field, along a line of smaller y co-ordinate value, by repeatedly both performing cyclic convolution with the periodic sequence of Equation (24) and adding a constant adjustment factor to all image values.

In the Dirichlet formulation of the second embodiment, the combined periodic logarithmic potential field is:

$$\frac{1}{2\pi} \log(\cosh(2\pi y) - \cos(2\pi(x-a))) - \frac{1}{2\pi}\log(\cosh(2\pi y) - \cos(2\pi(x+a))). \quad (27)$$

Values for this symmetric combined periodic logarithmic potential field, sampled uniformly and symmetrically about x=0, along lines of constant y co-ordinate value, have a total signal strength of zero and can be generated, to a close approximation, from uniformly sampled values of the same combined periodic potential field, along a line of smaller y co-ordinate value, by repeated cyclic convolution with the periodic sequence of Equation (24).

The total contribution to image values of a period of the periodic image from each of the constituent periodic logarithmic fields of Equation (26) and Equation (27), along lines of constant y co-ordinate value, increases with increasing absolute value of y. Despite this, in both formulations, the combined logarithmic potential field can be generated by line-by-line processing. In the Neumann formulation, this is achieved by the accumulating addition of the constant adjustment factor with each successive repetition of the line processing. In the Dirichlet formulation, this is achieved because the total contributions from the two corresponding constituent fields cancel each other, since the fields contribute values of opposite sign.

In summary, from an initial line of values obtained by uniformly sampling the periodic dipole potential field (19) and combined logarithmic potential fields (26) and (27), successive lines of sampled values of these fields, further removed from field centres, can be generated to a close approximation using repeated convolution with sequence (24). This is the basis of the efficient method of the second embodiment for generating piece-wise smooth images according to Equation (3) or Equation (7).

Both the dipole and logarithmic aperiodic potential field functions of Equations (16) and (17) have circular contours. Similarly, near their field centres, the periodic potential field functions of Equations (19) and (20) have contours which are approximately circular. The y value, 1/X, which is used to obtain the sequence of Equation (24), is chosen to balance the proportions of values in the x and y dimensions as successive sequences are obtained by self-convolution. In this way, a characteristic of radial symmetry is obtained in sequences generated by repeated convolution with the sequence of Equation (24). This is important in order to be able to produce pleasing isotropic colour variations in the piece-wise smooth image.

In the second embodiment, rather than using Equation (26) or Equation (27) for the periodic logarithmic potential field, the original Equation (20) is used but with line segment data expanded to include either a symmetric flipped copy or an anti-symmetric flipped copy, depending on whether the Neumann or Dirichlet formulation is used. Also, as in the first embodiment, rather than using values of periodic dipole and logarithmic fields directly, values of the integral along line segments of periodic dipole and logarithmic fields are used.

The value at a field point (x, y) of the integral of the periodic dipole potential field of Equation (19) centered at points along the line segment from $(x_1, y_1)$ to $(x_2, y_2)$ and oriented to the left can be expressed as:

$$\frac{1}{\pi}\operatorname{atan2}\left(\frac{\tanh(\pi(y-y_1))\tan(\pi(x-x_2)) - \tan(\pi(x-x_1))\tanh(\pi(y-y_2))}{\tanh(\pi(y-y_1))\tanh(\pi(y-y_2)) + \tan(\pi(x-x_1))\tan(\pi(x-x_2))}\right). \quad (28)$$

These values are periodic in x, with period 1. The tangent function, tan is continuous over domain intervals (π(k−½), π(k+½)), where k is an integer. Use of Equation (28) to express the integral of dipole periodic potential fields along a line segment is valid when the transformed line segment end point co-ordinates π(x−$x_1$) and π(x−$x_2$) are within the same domain interval of the tangent function, i.e. provided (x−$x_1$) and (x−$x_2$) are within the same integer interval (k−½, k+½), where k is an integer. If transformed line segment end point x co-ordinates are within separate domain intervals of the tangent function, the integral can be closely approximated by splitting the line segment into three smaller line segments, comprising two line segments which involves evaluation of the tangent function at values within the same domain interval, and a very short line segment which involves evaluation of the tangent function at values within successive domain intervals. The integral is then closely approximated by only using the contributions from the two line segments which do not involve evaluation of the tangent function at values within successive domain intervals.

The value at a field point (x, y) of the integral of the periodic logarithmic potential field of Equation (20) centered at points along a line segment from $(x_1, y_1)$ to $(x_2, y_2)$ can be approximated using a numerical integration method, such as trapezoidal integration. In this numerical integration, because the field has the same field coefficient along the line segment, trapezoidal numerical integration with uniform sampling is particularly simple—being a normalized sum of values of fields centred at segment end points weighted by ½ and values of fields centred at intermediate points of the segment having unit weighting. To reduce the calculation load, the sampling density can be reduced as the value of the distance from the field point to the line segment, normalized by division by the line segment length, increases. For distant field points only one evaluation of the logarithmic periodic potential field function (20) along a segment is necessary.

There are two further considerations in the numerical evaluation of the integral of periodic logarithmic potential fields (20) along line segments. Firstly, evaluation of the logarithmic potential field for a displacement (x, y) which is extremely small, should be avoided, as the logarithmic potential field value is unbounded in the vicinity of the origin. For this purpose, a small constant specifying a minimum absolute displacement for evaluations of logarithmic potential field values is useful. Secondly, the condition number of the matrix coefficients in the linear system of Equations (6) or the linear system of Equations (8) and (9) depends on the degree to which calculated values at field points of the integral of periodic logarithmic potential fields along a line segment are faithful to the characteristic of values at field points of the true integral, that there are no local extreme values except a single global extreme value at the segment centre. The degree of sampling in the numerical integration for field points close to the line segment and the previously mentioned minimum displacement allow satisfactory control of the matrix conditioning.

The Neumann formulation of the second embodiment is now described. Processing proceeds as in the first embodiment as described with reference to FIG. 1. However, in the second embodiment, firstly, periodic dipole and logarithmic potential field functions are used in step 120 in FIG. 1 to formulate the linear system of Equations (8) and (9) for the log field coefficients $\beta_i$ and the constant 'c'. Secondly, periodic dipole and logarithmic potential field functions are used in step 130 to calculate image values more efficiently in a line-by-line process using cyclic convolution of symmetrically extended periodic image data sequences.

The parameters $X_{im}$ and $Y_{im}$ denote the width and height of the piece-wise smooth image to be calculated, respectively. The period for the periodic potential field functions and the periodic image data sequences are set to be the odd integer, $X=2 X_{im}+1$. The periodic image data sequences comprise:

(i) $X_{im}$ values corresponding to the piece-wise smooth image to be calculated, having indices 1 to $X_{im}$, followed by (ii) $X_{im}$ values being a horizontally flipped and same signed copy of the piece-wise smooth image data, having indices $X_{im}, +1$ to $2.X_{im}$, together with (iii) an additional value at index position 0.

Cyclic convolution operates on sequences of X values, corresponding to lines of a pair of images, for example the pair of images constituting the extended image indicated as 430 in FIG. 4 comprising image 410 and its reflected copy 420.

For this second embodiment, in step 120, dipole field coefficients for each straight line segment are calculated as in the first embodiment. Log field coefficients are calculated for each straight line segment by formulating and solving the linear system of Equations (8) and (9). In formulating the linear system of equations, line segment dipole field values are evaluated using Equation (28) and line segment logarithmic field values are evaluated using trapezoidal integration of Equation (20) for the line segment in image 410 and for its copy in the flipped image 420.

In step 130, image values are calculated. This is done line-by-line using cyclic convolution. A top-level overview of this calculation is represented in FIG. 5. In step 510 of FIG. 5, a memory buffer which is the size of the image to be calculated 410, being $Y_{im}$ lines, i.e. rows, with $X_{im}$ values per line, is allocated and initialised with the value 'c' obtained by solving Equations (8) and (9). In step 520, in a downward pass proceeding from the top line of the image to the bottom line of the image, values are calculated for each line of the image 410 and added to the image memory buffer. In step 530, in an upward pass proceeding from the bottom line of the image to the top line of the image, another set of image values are calculated for each line of the image 410 and added to the image memory buffer, thereby completing calculation of the piece-wise smooth image 410.

FIG. 6 illustrates in greater detail step 520 being the downward image pass. The upward pass in step 530 proceeds in an entirely similar fashion.

In step 610 of FIG. 6, initialisation is performed for the downward image pass, namely a line counter 'y' is initialized to zero, a line buffer, which is the width of the extended data sequences, being the odd integer $X=2 X_{im}+1$, is initialized with zero values (line=zeros(X)), and a variable 'adjust' for adjusting updating values of the line buffer is initialised to zero.

In step 620, the line counter y is incremented.

In step 630, the line buffer is cyclically convolved with a spreading filter, i.e. with the sequence of Equation (24). This cyclic convolution is efficiently performed by a Fast Fourier Transform (FFT) operation on the line buffer, followed by multiplication of the transformed line buffer with the frequency coefficients of the sequence of Equation (24), and finally an inverse FFT operation is performed to recover the cyclically convolved sequence. FFT operations and inverse FFT operations are required only to generate $X_{im}+1$ of the X line buffer sequence values due to the symmetry of the line buffer data.

In processing step 640, the value of the variable 'adjust' is added to each of the values in the line buffer.

In processing step 650, field impulses for parts of the line segments are added to the line buffer. Contributions are added to the line buffer for periodic dipole and logarithmic potential fields of the parts of line segments that intersect the region of the image between y co-ordinate value y−1 and y co-ordinate value y. This is described in more detail hereinafter with reference to FIG. 7A. Also in processing step 650, the value of the 'adjust' variable is updated with a contribution for the part of each line segment that intersects the region of the image between y co-ordinate value y−1 and y co-ordinate value y. The contribution for a part of an i'th line segment is the length of the part of the line segment multiplied by the log field coefficient ($\beta$, for the line segment multiplied by the constant adjustment factor 2/X.

In step 660, the values in the line buffer at index positions 1 through $X_{im}$ are added to line y of the image buffer. In decision step 670, the value of y is examined to determine whether to process more image lines or not ($y<Y_{im}$?). If decision step 670 returns true (YES), processing continues at step 620. Otherwise, if step 670 returns false (NO), processing returns to continue at step 530 of FIG. 5.

Figure 7A:
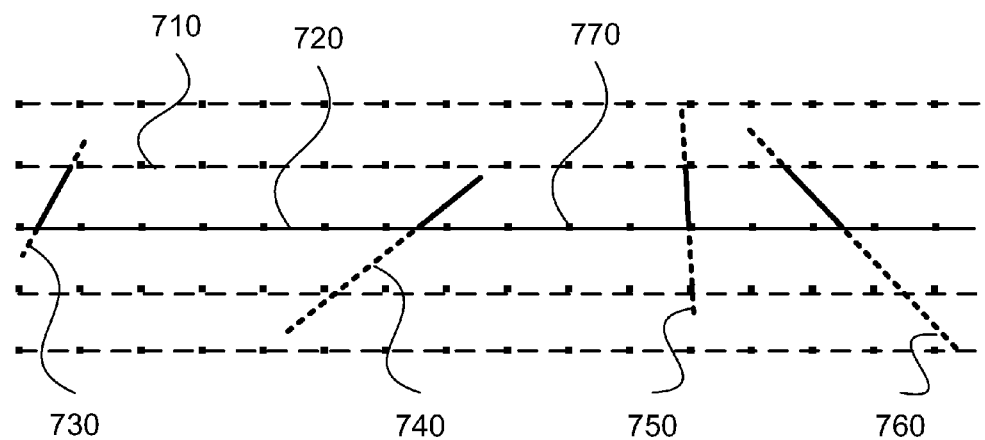
FIG. 7A is a close-up view of straight line segments specifying a piece-wise smooth image which is used to illustrate the line-by-line calculation of image values of the second embodiment.

FIG. 7A illustrates the operation of step 650 of FIG. 6. A portion of a previous line of the extended image 430 of FIG. 4, with y co-ordinate value y−1, having X image positions is represented by line 710, and a portion of a current line of image positions, with y co-ordinate value y, is represented by line 720. A line above this pair of lines and two lines below are also shown. Along each line, individual image positions are indicated by dots such as dot 770 on line 720. Four straight line segments 730, 740, 750, 760, which intersect the region between the lines 710 and 720, are shown. That is, these straight line segments include points with y co-ordinate values in the range (y−1, y). The sections of the straight line segments 730, 740, 750, 760 with y co-ordinate values in this range are shown as solid lines. Remaining sections of these straight line segments are shown dotted.

Figure 7B:
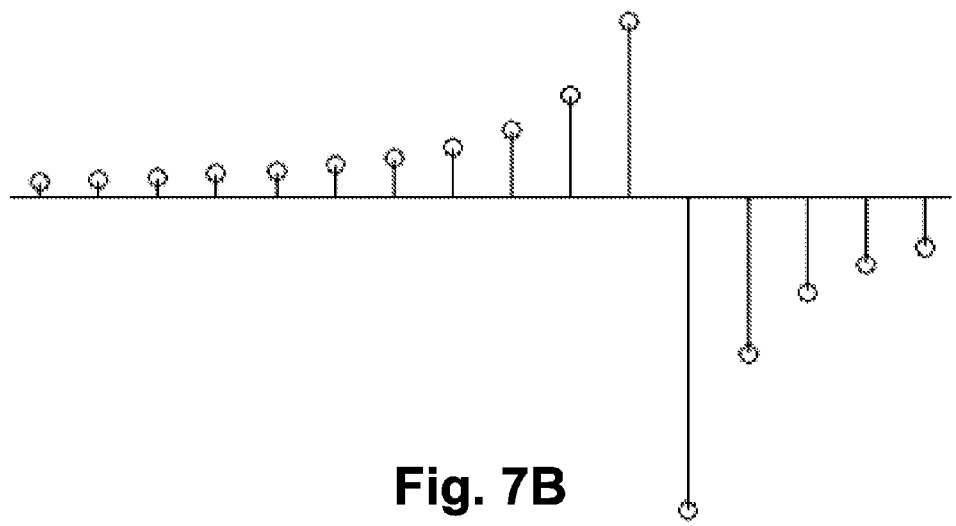
FIGS. 7B and 7C are plots of example dipole field values and log field values along part of a line of an image.
Figure 7C:
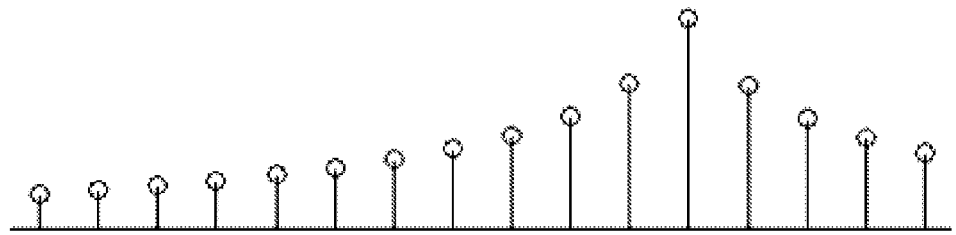

In step 650, line segment periodic dipole field and periodic logarithmic contributions are calculated at image positions such as 770 along the current image line 720 for the sections of the straight line segments which intersect the region between current image line 720 and the previous image line 710. These contributions are calculated by firstly calculating line segment periodic dipole field values according to Equation (28) and line segment periodic logarithmic field values by trapezoidal integration of Equation (20) for line segments in the image 410. Secondly each of these dipole field values is multiplied by the dipole field coefficient for its line segment and each of these logarithmic field values is multiplied by the logarithmic field coefficient for its line segment. Thirdly, to these resulting values for the un-flipped image are added a corresponding set of resulting values for the same sections of the straight line segments in the flipped image 420; the corresponding resulting values being a copy of the resulting values for the un-flipped image, which is flipped about the midpoint of the line. The resulting contributions are added to the line buffer. FIGS. 7B and 7C show example periodic dipole and periodic logarithmic field values for the section of line segment 750 with y co-ordinate values in the range (y−1, y). Contributions to the current image line 720 need not be calculated for the index positions $X_{im}$+1 through 2. $X_{im}$ of the image line as these field values can be obtained as the flipped copy of the field values for the positions 1 through $X_{im}$.

The Dirichlet formulation of the second embodiment operates in a similar fashion to the Neumann formulation of the second embodiment. The differences in operation are as follows. In step 120, the linear system of equations is formulated using line segment dipole field values and log field values evaluated by including the negative of the field values for the line segments in the flipped image. In step 510 of FIG. 5, the image-sized memory buffer is initialised either with zero or with the value 'c' depending on whether the log field coefficients are obtained by solving the linear system of Equations (3) or the linear system of Equation (8) and Equation (9). The operation of steps 520 and 530, which calculate image values in a downward and upward pass, as explained previously using FIG. 6, do not maintain or use the 'adjust' variable of FIG. 6. In the operations of step 650 of steps 520 and 530, as previously explained using FIG. 7A, line segment periodic dipole and periodic logarithmic field values are calculated both for each part of a line segment in the image 410 which intersects the region between the previous image line 710 and the current image line 720 and for the copy of that part line segment in the flipped image 420. The contribution from line segments in the flipped image 420 is the negative of the flipped contribution from line segments in the un-flipped image 410. Contributions to the current image line 720 need not be calculated for the index positions $X_{im}$+1 through 2. $X_{im}$ of the image line as these field values can be obtained as the negative of the flipped copy of the field values for the positions 1 through $X_{im}$.

The second embodiment has been described for the case where values are calculated for the full piece-wise smooth image. As with the first embodiment, it is possible in processing step 130, to only calculate values for a section of the image. Modifications to processing for this case are now described. Firstly, the steps 520 and 530 of FIG. 5, rather than operating over all image lines, operate over a band of lines covering the section of the image to be evaluated. Secondly, the addition of part segment field impulses to the first line of a band is performed by adding the field contributions to the line for all segments or part segments that are in the region preceding the line.

Variations on the above methods of the first and second embodiments can be implemented where final image values are a close approximation of image values given by Equation (3) or Equation (7) with various combinations of aperiodic and periodic, line segment dipole and logarithmic potential fields. In all these variations of methods the log field coefficient weights, which are used in calculating final image values, whether directly by Equation (3) or Equation (7) or indirectly by line-by-line processing, are calculated by solving the linear system of Equations (6) or the linear system of Equation (8) and Equations (9). Naturally, it is important that the calculation of dipole and log field values as used in calculating final image values, closely approximates the calculation of dipole and log field values used in formulating the linear system of Equations (6) or the linear system of Equation (8) and Equations (9).

From the above description it can be seen that piece-wise smooth images can be calculated simply and efficiently with controlled accuracy from line path image value constraints. In contrast to the multigrid method of calculating such piece-wise smooth images, the described methods separate the approximate solution of the partial differential equation from the calculation of the image. When it is only required to calculate a small portion of the image this can be a significant advantage. Also in contrast to the multigrid method, the methods in accordance with the first and second embodiments are less demanding in their working memory requirements. The second embodiment in providing efficient calculation of image values only requires working memory for line-based operations. Also in distinction to multigrid or other methods of solving Laplace's equation which perform an initial constraint rasterisation, the described methods allows controlled accuracy in modelling the constraints. As a consequence, the described methods are capable of rendering videos consisting of successive images specified by colour values along either side of paths, without flickering artefacts.

INDUSTRIAL APPLICABILITY

The arrangements described are applicable to the computer and data processing industries and particularly for rendering an image.

Methods, apparatuses, and computer readable storage medium for rendering a piece-wise smooth image have been described. The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A computer-implemented method of rendering a piece-wise smooth image, said image specified by image values along opposite sides of paths, said method comprising:
   converting said paths to chains of straight line segments and setting image values for each side of each line segment;
   determining first and second coefficients for each line segment, said first coefficient for each line segment being based on a difference between said specified image values on opposite sides of the segment, said second coefficient for each line segment being based on an average of said image values on opposite sides of the segment; and
   calculating each image value as the addition of a sum over all line segments of the product of the first coefficient for a segment with a value for a dipole potential field function for the segment, being an integral of dipole fields centered at points along the segment, and a sum over all line segments of the product of the second coefficient for a segment with a value for a logarithmic potential field function for the segment, being an integral of logarithmic fields centered at point along the segment.

2. The method as claimed in claim 1, wherein either or both dipole potential field function and logarithmic potential field function are periodic.

3. The method as claimed in claim 2, wherein either or both said periodic dipole and logarithmic potential field functions are used in said calculating step to calculate image values in a line-by-line process using cyclic convolution of periodic image data sequences.

4. The method according to claim 3, wherein either or both of said sums over all line segments are calculated as a sum of values calculated in a forward direction line-by-line pass through the image and values calculated in a reverse direction line-by-line pass through the image.

5. The method according to claim 4, wherein each line of said sums of values calculated in a line-by line pass through the image is calculated using the sum of values of a previous line convolved with a filter, and the sum of line segment field function values, for portions of said line segments intersecting the region preceding the current line and not yet included in a sum of line segment field function values for the pass, multiplied by a coefficient for the line segment.

6. The method according to claim 1, further comprising the step of outputting said image using the calculated image values using a printer or graphical display device.

7. The method as claimed in claim 1, wherein said image is an entire image or a portion of a larger image.

8. The method as claimed in claim 1, wherein each image value is f(x, y) calculated using the following equation:

$$f(x, y) = \sum_i \alpha_i D_i(x, y) + \sum_i \beta_i L_i(x, y)$$

where:
$D_i(x, y)$ is the value for the dipole field function, at a field point (x, y), of the integral of unweighted dipole fields centered at points along the i'th straight line segment and oriented normal to the straight line segment to be positive on the left hand side, and $L_i(x, y)$ is the value for the logarithmic field function, at a field point (x, y), of the integral of unweighted logarithmic fields centered at points along the i'th straight line segment.

9. The method as claimed in claim 8, wherein the determining step comprises calculating the second coefficients by solving a system of linear equations as follows:

$$\sum_j \beta_j L_j(x_i, y_i) = \frac{i c_L + i c_R}{2} - \sum_j \alpha_j D_j(x_i, y_i)$$

where $\alpha_j$ is the first coefficient for the j'th straight line segment, $\beta_j$ is the second coefficient for the j'th straight line segment, icL is a representative value for the image values along the left of the i'th straight line segment and icR is a representative value for the image values along the right of the i'th straight line segment.

10. The method as claimed in claim 1, wherein each image value is f(x, y) calculated using the following equation:

$$f(x, y) = \sum_i \alpha_i D_i(x, y) + \sum_i \beta_i L_i(x, y) + c$$

where c is a constant value, $D_i(x, y)$ is the value for the dipole field function, at a field point (x, y), of the integral of unweighted dipole fields centered at points along the i'th straight line segment and oriented normal to the straight line segment to be positive on the left hand side, and $L_i(x, y)$ is the value for the logarithmic field function, at a field point (x, y), of the integral of unweighted logarithmic fields centered at points along the i'th straight line segment.

11. The method as claimed in claim 10, wherein the determining step comprises calculating the constant value c and the second coefficients by solving a system of linear equations as follows:

$$\sum_i \beta_i L_i(x_i, y_i) = 0$$

$$\sum_j \beta_j L_j(x_i, y_i) = \frac{i c_L + i c_R}{2} - \sum_j \alpha_j D_j(x_i, y_i) - c$$

where $\alpha_j$ is the first coefficient for the j'th straight line segment, $\beta_j$ is the second coefficient for the j'th straight line segment, icL is a representative value for the image values along the left of the i'th straight line segment and icR is a representative value for the image values along the right of the i'th straight line segment.

12. An apparatus for rendering a piece-wise smooth image, said image specified by image values along opposite sides of paths, said apparatus comprising:
   a memory for storing data and a computer program; and
   a processor unit coupled to the memory for executing a computer program, said memory and said processor configured to render said piece-wise smooth image, the computer program comprising:

computer program code means for converting said paths to chains of straight line segments and setting image values for each side of each line segment;

computer program code means for determining first and second coefficients for each line segment, said first coefficient for each line segment being based on a difference between said specified image values on opposite sides of the segment, said second coefficient for each line segment being based on an average of said image values on opposite sides of the segment; and computer program code means for calculating each image value as the addition of a sum over all line segments of the product of the first coefficient for a segment with a value for a dipole potential field function for the segment, being an integral of dipole fields centered at points along the segment and a sum over all line segments of the product of the second coefficient for a segment with a value for a logarithmic potential field function for the segment, being an integral of logarithmic fields centered at points along the segment.

13. The apparatus as claimed in claim 12, wherein either or both dipole potential field function and logarithmic potential field function are periodic.

14. The apparatus as claimed in claim 13, wherein either or both said periodic dipole and logarithmic potential field functions are used in said computer program code means for calculating to calculate image values in a line-by-line process using cyclic convolution of periodic image data sequences.

15. The apparatus according to claim 14, wherein either or both of said sums over all line segments are calculated as a sum of values calculated in a forward direction line-by-line pass through the image and values calculated in a reverse direction line-by-line pass through the image.

16. The apparatus according to claim 15, wherein each line of said sums of values calculated in a line-by line pass through the image is calculated using the sum of values of a previous line convolved with a filter, and the sum of line segment field function values, for portions of said line segments intersecting the region preceding the current line and not yet included in a sum of line segment field function values for the pass, multiplied by a coefficient for the line segment.

17. A non-transitory computer readable storage medium having recorded therein a computer program for rendering a piece-wise smooth image, the computer program comprising:

computer program code means for converting said paths to chains of straight line segments and setting image values for each side of each line segment;

computer program code means for determining first and second coefficients for each line segment, said first coefficient for each line segment being based on a difference between said specified image values on opposite sides of the segment, said second coefficient for each line segment being based on an average of said image values on opposite sides of the segment; and computer program code means for calculating each image value using the addition of a sum over all line segments of the product of the first coefficient for a segment with a value for a dipole potential field function for the segment, being an integral of dipole fields centered at points along the segment, and a sum over all line segments of the product of the second coefficient for a segment with a value for a logarithmic potential field function for the segment, being an integral of logarithmic fields centered at points along the segment.

18. The computer readable storage medium as claimed in claim 17, wherein either or both dipole potential field function and logarithmic potential field function are periodic.

19. The computer readable storage medium as claimed in claim 18, wherein either or both said periodic dipole and logarithmic potential field functions are used in said computer program code means for calculating to calculate image values in a line-by-line process using cyclic convolution of periodic image data sequences.

20. The computer readable storage medium according to claim 19, wherein either or both of said sums over all line segments are calculated as a sum of values calculated in a forward direction line-by-line pass through the image and values calculated in a reverse direction line-by-line pass through the image.

21. The computer readable storage medium according to claim 20, wherein each line of said sums of values calculated in a line-by line pass through the image is calculated using the sum of values of a previous line convolved with a filter, and the sum of line segment field function values, for portions of said line segments intersecting the region preceding the current line and not yet included in a sum of line segment field function values for the pass, multiplied by a coefficient for the line segment.

* * * * *